(12) United States Patent
Elberbaum

(10) Patent No.: US 7,502,546 B2
(45) Date of Patent: Mar. 10, 2009

(54) METHOD AND APPARATUS FOR DIGITALLY RECORDING AND SYNCHRONOUSLY RETRIEVING A PLURALITY OF VIDEO SIGNALS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 1095 days.

(21) Appl. No.: 10/696,497

(22) Filed: Oct. 29, 2003

(65) Prior Publication Data

US 2005/0094966 A1  May 5, 2005

(51) Int. Cl.
| | |
|---|---|
| H04N 7/08 | (2006.01) |
| H04N 5/222 | (2006.01) |
| H04N 5/228 | (2006.01) |
| H04N 7/00 | (2006.01) |
| H04N 7/16 | (2006.01) |
| H04N 7/18 | (2006.01) |
| H04N 7/173 | (2006.01) |
| H04N 9/475 | (2006.01) |
| H04N 11/08 | (2006.01) |
| H04H 60/29 | (2008.01) |
| H04H 60/32 | (2008.01) |
| H04L 7/00 | (2006.01) |
| G08B 13/00 | (2006.01) |
| G08B 29/00 | (2006.01) |

(52) U.S. Cl. .................. 386/92; 386/46; 340/506; 340/541; 340/565; 348/143; 348/152; 348/153; 348/156; 348/159; 348/222.1; 348/333.05; 348/473; 348/476; 348/490; 348/518; 375/356; 725/20; 725/22; 725/115; 725/145; 725/151

(58) Field of Classification Search ............. 386/92, 386/46, E9.04; 340/506, 541, 565; 348/143, 348/152, 153, 156, 159, 222.1, 333.05, 473, 348/476, 490, 518, E5.014, E5.104, E5.105, 348/E5.112, E7.036, E7.085, E7.086; 375/356, 375/E7.027, E7.088, E7.099; 725/20, 22, 725/115, 145, 151; 345/1.1, 698
See application file for complete search history.

(56) References Cited

U.S. PATENT DOCUMENTS 4,603,352 A * 7/1986 Kaneta et al. ............ 348/518

(Continued)

*Primary Examiner*—Thai Tran
*Assistant Examiner*—Syed Y Hasan
(74) *Attorney, Agent, or Firm*—Katten Muchin Rosenman LLP

(57) ABSTRACT

A method and apparatus for connecting a plurality of digital video recorders to a plurality of video transmitters via first transmission lines and for connecting the plurality of digital video recorders to a playback receiver via second transmission lines. The playback receiver incorporates an external synchronizing generator for externally synchronizing the plurality of the digital video recorders and the video transmitters. The recorders receiving the video signals generate and inject into the output signals a signal corresponding to identification codes allotted to each video signals. The playback receiver has a selection control circuit receiving selectively and synchronously any individually coded playback or monitored signal, or multiple playback or monitored signals which are displayed individually or in a split screen, respectively. The digital video recorder includes a time-date signal generator and a processing circuit compressing the video signals and outputting them with an injected identification code and time and date of the recorded signals and storing the signal into at least one memory device in an endless rotation, wherein freshly stored signals replace the oldest stored signals.

38 Claims, 9 Drawing Sheets

U.S. PATENT DOCUMENTS

| | | |
|---|---|---|
| 4,943,864 A | 7/1990 | Elberbaum |
| 5,267,039 A * | 11/1993 | Elberbaum ............... 348/476 |
| 5,319,453 A * | 6/1994 | Copriviza et al. ........... 346/6 |
| 5,923,363 A * | 7/1999 | Elberbaum ............... 348/156 |
| 6,359,560 B1 * | 3/2002 | Budge et al. ............. 340/541 |
| 6,654,560 B2 * | 11/2003 | Motomura ............... 396/310 |
| 2002/0056131 A1 * | 5/2002 | Hayashi et al. ........... 725/115 |
| 2004/0028142 A1 * | 2/2004 | Kim ................... 375/240.25 |
| 2004/0046706 A1 * | 3/2004 | Lim et al. ................. 345/1.1 |

* cited by examiner

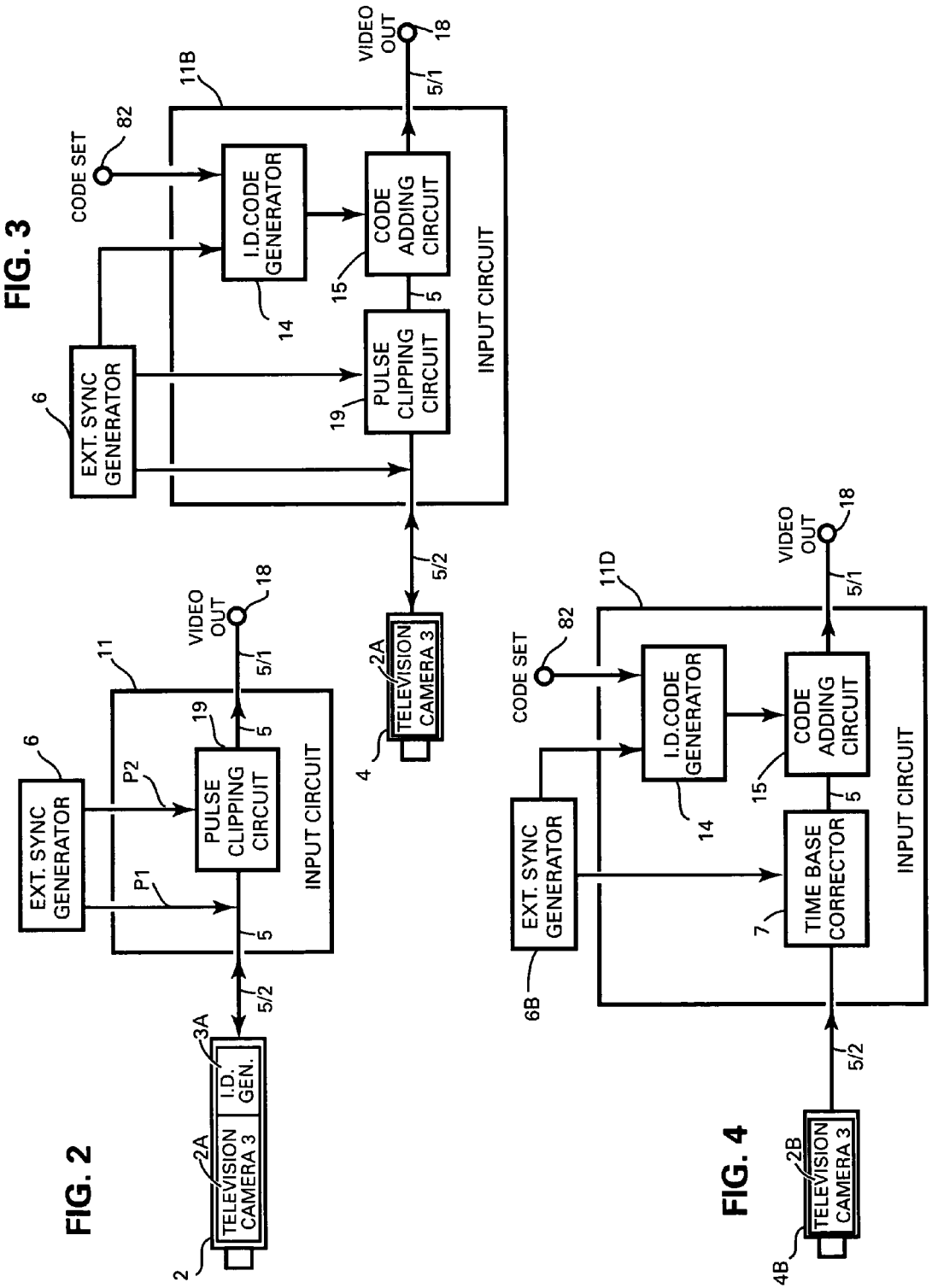

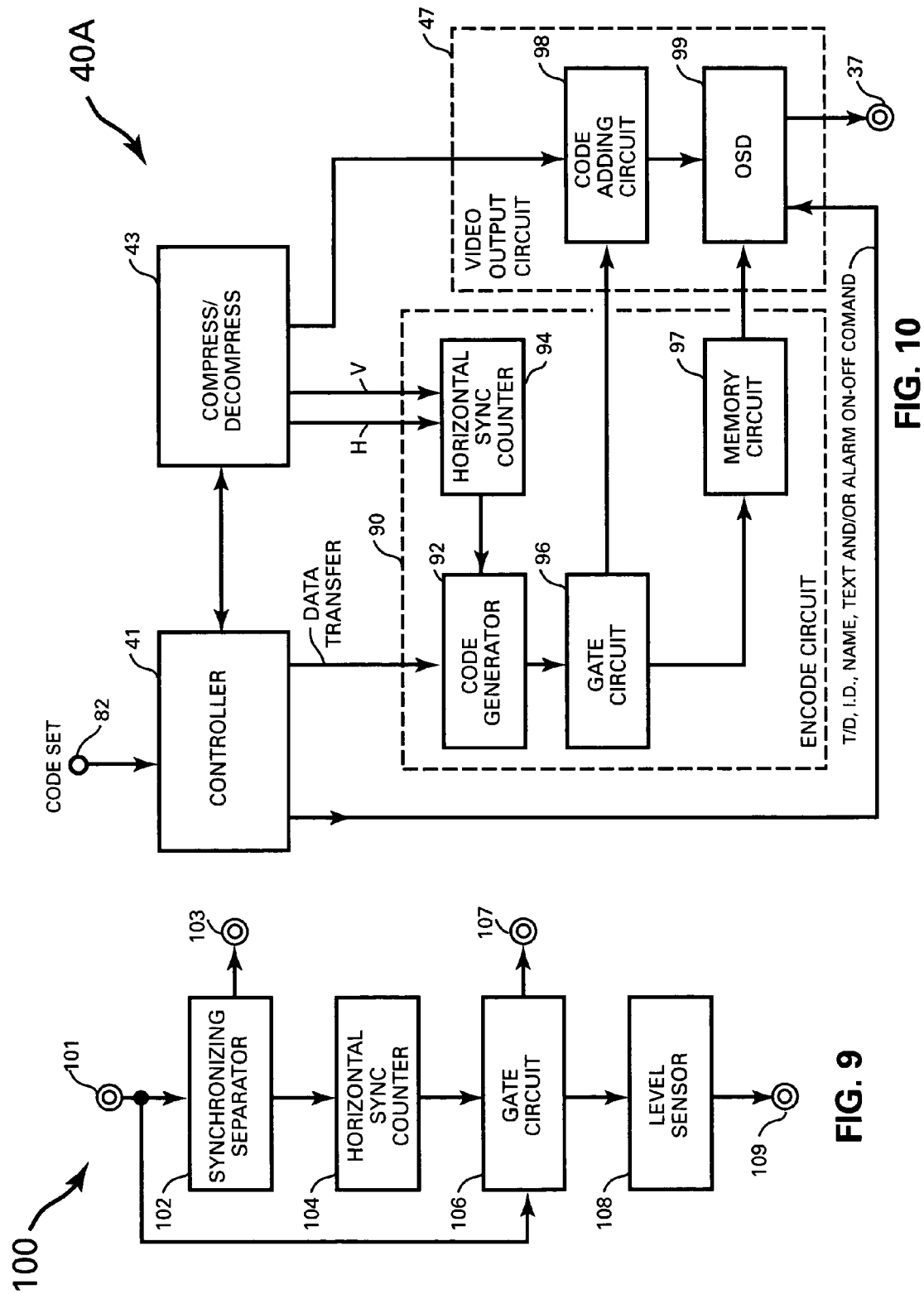

METHOD AND APPARATUS FOR DIGITALLY RECORDING AND SYNCHRONOUSLY RETRIEVING A PLURALITY OF VIDEO SIGNALS

BACKGROUND OF THE INVENTION

1. Field of the Invention

This invention relates to an apparatus for processing of television camera signals used in close circuit television for recording and monitoring system.

2. Description of the Prior Art

In information signal processing systems, such as a television monitoring system, a video cassette recorder or a digital video recorder is connected to a television camera for recording television camera signals at a time lapse or at a real time. A video cassette recorder or a digital video recorder may also be connected through an electronic switch, known as a multiplexer, to a plurality of television cameras via plurality of transmission lines. The electronic switch or the multiplexer provides for a fast rate sequential switching for recording onto the video recorder a picture image of one camera after another and for selectively displaying the playback or monitoring each of individual camera signals, or for combining multiple camera signals or multiple recorded stored signals into a multi screen display, for example four, nine or sixteen cameras onto one display known as a split screen display. Such a system and method and apparatus are disclosed in U.S. application Ser. No. 09/818,243 filed Mar. 27, 2001.

Since the multiple camera signals are recorded one after another in serial sequence, it is not possible to record any one of plurality camera at real time, such as the 30 frames or the 60 fields per second, used in the NTSC standard.

Moreover, non externally synchronized television cameras generate their field or frame sync at random, requiring the detection by the digital video recorder of the vertical sync signal, pertaining to each of the signals of sequencing television camera signals and therefore start the recording or monitoring of each such field or frame at random. This causes random delays in processing of each field or frame processing, thereby causing a longer lapse time in recording or displaying of each individual camera signal. This causes also a slower refresh rate for the split screen displays.

Therefore in such an information processing system, it is preferable to mutually lock the internal synchronizing signals of all of a plurality of connected television cameras and the electronic switching time to an external synchronizing signal.

A known apparatus for synchronizing a plurality of television cameras is an apparatus for transmitting an external synchronizing signal from an external synchronizing generator to the television cameras by injecting the external synchronizing signal into the video signal transmission line and locking a generator of an internal synchronizing signal of the television camera by means of the transmitted external synchronizing signal. Such an apparatus is disclosed in U.S. Pat. No. 4,603,352 the entire content of which is incorporated herein by reference.

Another known apparatus for synchronizing a plurality of signals of the television camera is an apparatus for memorizing each signal of the television camera in a memory circuit and feeding the signals to the video recorder, synchronously via the electronic switch from the memory circuits. Such an apparatus is disclosed in U.S. Pat. No. 5,267,039 the entire content of which is incorporated herein by reference.

Furthermore, the known apparatuses for recording a plurality of camera signals at fast sequencing rate require that each individual camera signal will incorporate a coded identification signal, providing for simple retrieval of the signal through a coded selection, such identification code is disclosed in U.S. Pat. No. 4,943,864 the entire content of which is incorporated herein by reference. In the case of using analogue video cassette recorder, the coded identification is known to be recorded during the vertical blanking period of television signals, but in the case of using a digital video recorder it is known that digital video recorders ignore the vertical blanking period and instead they employ a complex control software for indexing the files of the recorded digital signals of each individual picture.

Whenever a single television camera is connected to a digital video recorder, the digital video recorder synchronizes itself to the synchronizing signal generated by the camera and therefore can process and record a camera signal at real time, but however limits the monitoring of the signal and recording and the play back to one camera at a time only.

In systems employing a plurality of digital video recorders each connected to a single camera it is not possible to combine efficiently the output signals of the digital video recorders into the split screen displays for monitoring or playback because the digital video recorders are not externally synchronized and locked to each other, and therefore generate their field or frame at random.

Furthermore, the output signals of digital video recorders are display signals consisting of red, green and blue components that are commonly fed to computer screens known as VGA. Such VGA output signals fed from multiple digital video recorders are complex and costly to combine into split screen displays and they are therefore never used for split screen combination.

On the other hand, some digital video recorders convert the recorded output signals into composite video signal. However, as stated above, in a system comprising a plurality of digital video recorders, their output signals are not externally synchronized, nor are the signals coded for identification, and therefore in order to display those signals on a split screen, the signals must be coded, their signal sync must be detected and merging of those signals takes place at random timing, which causes a slow refresh rate and lower picture quality.

SUMMARY OF THE INVENTION

It is the object of the present invention to provide a method and an apparatus for externally synchronizing digital video recorders, provided with setting of an individual identification code signal, alarm input for generating alarm code signals and time and date generator for generating time and date signals, for recording a signal of a single television camera in a synchronous, indexed and uninhibited FIFO (First In First Out) rotation and to retrieve any of the recorded images by addressing the coded identification number and/or the recorded time and date and/or a coded alarm number.

Another object of the present invention is to provide a method and apparatus for connecting output signals of a plurality of synchronized digital video recorders to a receiving means, such as a well known Quad, 9 split and 16 split switcher/selector, for generating a split screen display by combining the currently processed camera signals for monitoring or retrieving multiple recorded camera signals for playback by addressing the signal's identification codes, the time and date of the recording and/or an alarm code pertaining any of the digital video recorders connected to said receiving means.

A further object of the present invention is to provide a method and apparatus for a simple connection and feeding of the external sync signals to the digital video recorder through its video output connector and for transferring the external sync signals from the digital video recorder to the television camera through the video input connector, wherein both, the fed external sync signals and the transferred external sync signals are propagated via the video transmission lines in the reverse direction to the video signal propagation.

According to the present invention a method for processing, recording and retrieving video signals generated by an externally synchronized television camera generating an individually allotted identification code signal, into and from a digital video recorder having an external sync receiving circuit and an external sync transfer circuit for transferring the external sync to the camera, at least one memory storage device for routinely storing the camera signals in endless rotation, an alarm input circuit for coding alarms, and a time and date generator for indexing the time and date of the recording, the method comprising the steps of, detecting and registering an identification code of an inputted video signal, compressing the video signals and storing the compressed video signal along with the time and date of the recording in a routine cycle into the memory storage device to capacity, in an endless rotation, wherein freshly processed signals replaces the oldest stored signals, and coding the stored signals recorded during alarms with alarm codes and wherein the freshly fed camera signals and the routinely stored camera signals and the alarm coded camera signals are selected and retrieved from the storage device on the basis of the registered identification code, the time and date of the recording and the alarm code and are decompressed, locked to the external sync and injected with the identification code, the time and date of the recording and the alarm code during a vertical blanking period of the decompressed video signal.

In an embodiment, the method for processing, recording and retrieving video signals generated by a television camera into and from an externally synchronized digital video recorder having an external sync receiving circuit, at least one memory storage device for routinely storing the camera signals in endless rotation, an identification code generator for registering and generating identification code signal, an alarm input circuit for coding alarms and time and date generator for indexing the time and date of the recording, may comprise the steps of; compressing the inputted video signals and storing the compressed signal along with the time and date of the recording in a routine cycle into the memory storage device to capacity, in an endless rotation, wherein freshly processed signals replace the oldest stored signals and coding the stored signals recorded during alarms with alarm codes, and wherein the freshly fed camera signals and the routinely stored camera signals and the alarm coded camera signals are selected and retrieved from the storage device on the basis of the registered identification code, the time and date of the recording or the alarm code and are decompressed, locked to the external sync and injected with the identification code, the time and date of the recording and the alarm code during the vertical blanking period of the decompressed video signal.

The method for processing, recording and retrieving video signals of the present invention further comprises the steps of duplicating the alarm coded camera signals and storing the duplicated alarm coded camera signals into an exclusive memory device or into a memory portion which is excluded from the routine recording in an endless FIFO rotation, thereby protecting the alarm related recording from the routine erasure and retaining the alarm related recordings for future playback.

According to the invention a method for processing and retrieving multiple video signals of a plurality of digital video recorders connected to a receiving and display means adapted to select for displaying an individual signal or multiple signals selectively from the plurality of the connected output signals, comprises the steps of generating selection command signals on the basis of the identification codes, the time and date of the recording and the alarm codes and feeding the selection and command signals to said plurality of digital video recorders for displaying any individually selected signal or for combining multiple selected signals into a split screen display.

An apparatus for processing, recording and retrieving a signal according to the present invention comprises an input circuit means for receiving analogue or digital video signal generated by a television camera incorporating an identification code signal allotted to it;

an external synchronizing receiving and transfer means for synchronizing internal synchronizing generators of recording means and the television camera;

a recording means for recording and storing the processed video signals received from the input circuit means along with an identification code and the time and date of the recording and for playing back the stored signals and outputting the played back signals; and an encode/decode means for extracting and decoding the identification code signal of the video signal fed from the input circuit means and for encoding and injecting newly the identification code signal along with the time and date into the played back video signal during the vertical blanking portion of the played back signal.

The television camera is allotted with an identification code, for which it may incorporate a circuit for generating identification code signals corresponding to the identification code, and a circuit for generating a signal wherein the identification code signals are injected into the video signal. Such an apparatus, as stated above, is disclosed in U.S. Pat. No. 4,943,864, the entire content of which is incorporated herein by reference.

Alternatively, the allotted identification code signals can be generated by a code generator for injecting an identification code signal into the video signal along the individual transmission line or by a code generator and code mixing circuits incorporated in the recording means for injecting an identification code into the output video signals.

When the video signals generated by the television camera are not externally synchronized, the recording means may include at least one of a sync separator circuit, a clock generator and a phase locking circuit (known as PLL) for locking the outputted video signal's sync with the detected internal sync of the video signal fed from the camera or with the fed external sync signal.

The recording means may include a circuit for compressing the received video signals and outputting the compressed signals to the memory means, a circuit for decompressing the retrieved stored signals and a circuit for converting the decompressed signals to a video signal along with a circuit for injecting the identification code signal and the time and date into the vertical blanking portion of the video signals.

The recording means may further include a CPU (central processing unit) for processing and controlling the different circuits, the time and date, and other functions of the digital recording process and for controlling the memory devices used for storing the digital signals through a memory system control circuit.

The CPU is fed with key commands or remote commands or by an alarm input signals through a control in a terminal or terminals and feeds returned control signals through an output control terminal for combining efficiently a setup of plurality of digital recorder means.

The CPU is provided with means for setting an identification code to the recording means for enabling a simple addressing to a specific digital recorder means for recall a playback signals from a plurality of recording means, and for addressing a specific digital recorder means by a playback receiver means.

The playback receiver means may include a selector and a circuit for setting a selector code, a circuit for extracting and decoding the identification code signal from the received video signal and output the retrieved video signal to a television monitor.

The playback receiver means may include a circuit for generating displays onto the monitor screen known as OSD (on screen display), a circuit for displaying on command the identification number of the selected camera or its name and/or text related to the decoded identification number, and a memory circuit for recording and retaining the text and/or names of the identification code number used for the plurality of cameras connected to the plurality of the digital recorders of a digital recording system setup.

The OSD circuit along with the identification decoding circuit further provides for decoding the time and date contained in the vertical blanking portion of the extracted signal and to display, upon command, the time and date of monitored signals or of the recording of the playback video signal.

The playback receiver means may further include a playback control circuit for feeding control signals to the digital recorders for selecting an individual output signal or multiple output signals for monitoring or playback from any of the connected digital recorders on the basis of the identification code, the time and date of the recording and/or, an alarm code to any one or multiple of the digital recorders thereby providing a simple monitoring or playback selection for any number of digital recorders, connected to it.

The playback receiver means may include a well known circuit for combining multiple video signals into a split screen such as Quad, 9 split, 16 split or picture in picture (PIP) for feeding a split screen video signal to the television monitor.

BRIEF DESCRIPTION OF THE DRAWING

The foregoing and other objects and features of the invention will become apparent from the following description of preferred embodiments of the invention with reference to the accompanying drawings, in which:

FIG. 2 is a block diagram which shows an electric input circuit including a known externally synchronizing television camera incorporating a known identification code generating circuit of the preferred embodiment;

FIG. 3 is a block diagram showing electric circuit of yet another embodiment of the input circuit with an identification code generating circuit;

FIG. 4 is a block diagram showing another preferred embodiment of the receiver incorporating a time base corrector and an identification code generating circuit of the input circuit;

FIG. 9 is a block diagram showing a selective code processing circuit as a preferred embodiment of the present invention;

FIG. 10 is a block diagram showing an embodiment of the code injecting circuit of the present invention;

DETAILED DESCRIPTION OF THE PREFERRED EMBODIMENTS

Figure 1:
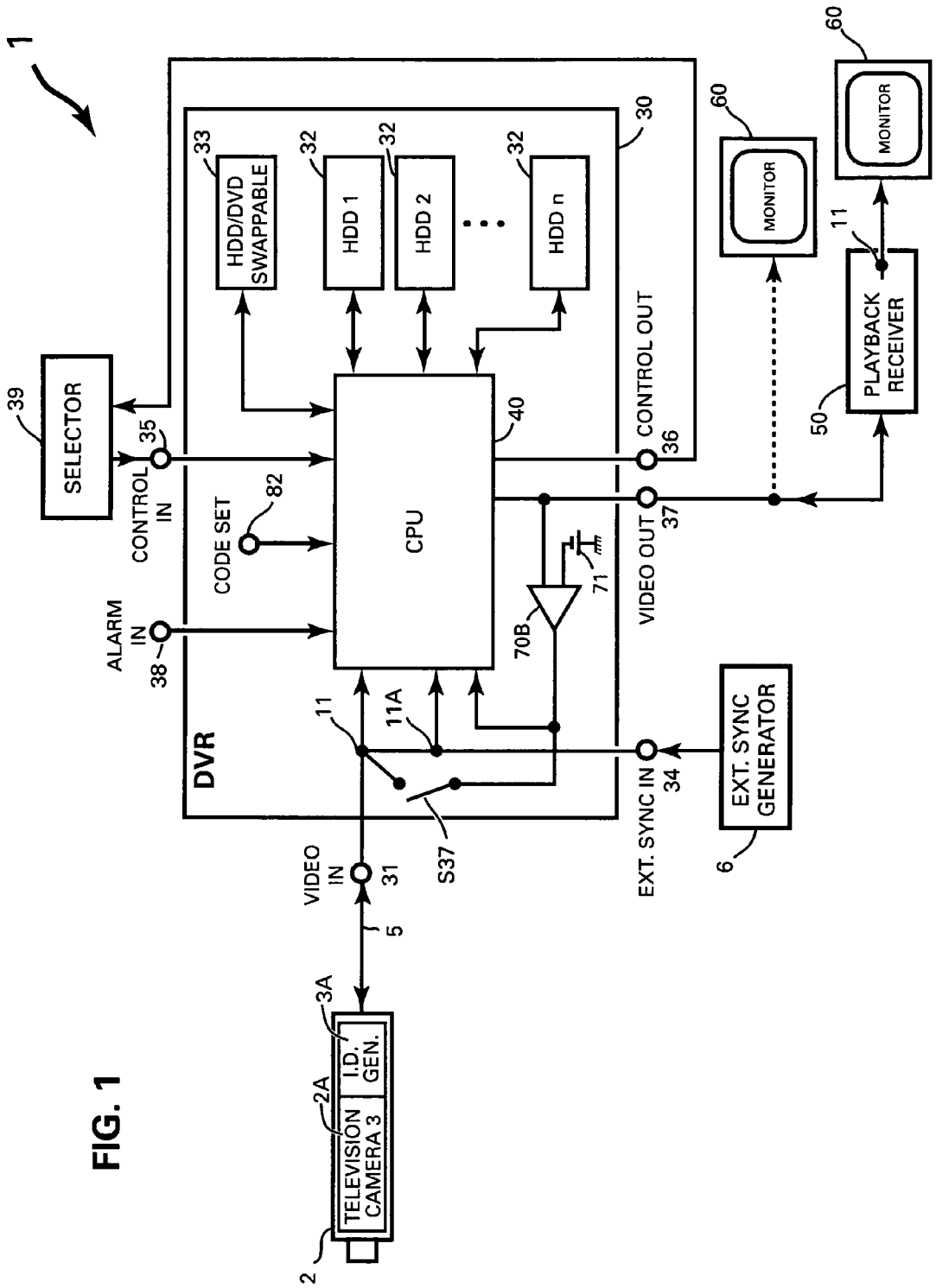
FIG. 1 is a block diagram showing an electric circuit for processing, digitally recording, and retrieving a plurality of video signals of a preferred embodiment according to the present invention.

Referring to FIG. 1, an apparatus 1 for processing, digitally recording, and retrieving a plurality of video signals comprises an external synchronizing signal generator 6, a transmitter 2 incorporating television cameras 2A synchronized by the external synchronizing signal and generating a video signal corresponding to the images picked-up by the television cameras and an identification code generator 3A for generating and injecting into the output video signal of the transmitter 2 a code signal allotted to the transmitter.

In the following description, video signals can be composite video signal, digital video signal or compressed video signal.

Synchronizing pulses fed from the external sync generator 6 are injected into a video transmission line 5 for transmitting the external synchronizing signal to the television cameras 2A. A digital video recorder 30 for recording and playing back video signals is connected through its input terminal 31 to the transmitter 2 generating the video signal; a code selector circuit 39 is provided for selecting the time and date of the recording and/or a code commensurate with a code allotted to the transmitter 2 or commanding the playback or monitoring, and a monitor 60 for displaying an image corresponding to retrieved video signal.

Figure 5:
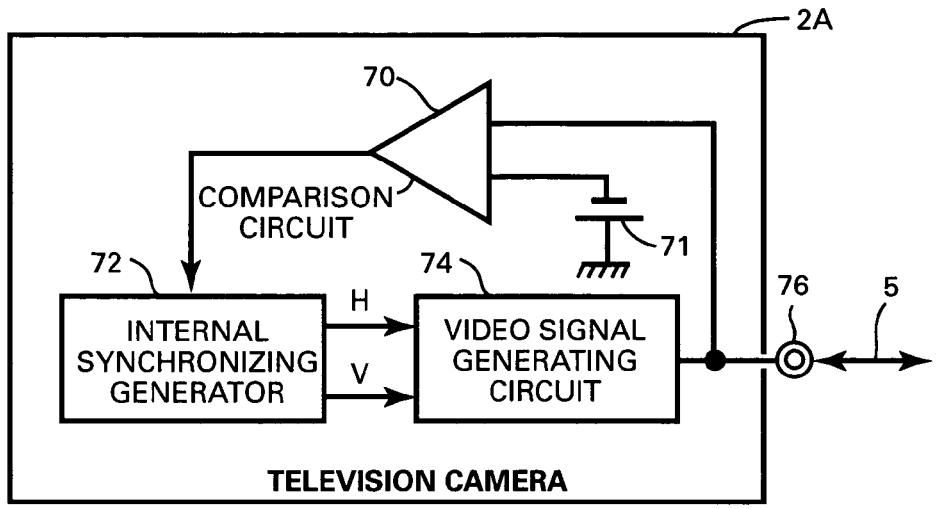
FIG. 5 is a block diagram of an electric circuit of a television camera with a well known external synchronization circuit.

As shown in FIG. 5, the television camera 2A is a well-known television camera synchronized by a synchronizing pulse having a level higher than the white level of a composite video signal, as described in U.S. Pat. No. 4,603,352, the entire contents of which are incorporated herein by reference.

The frequency of the external synchronizing signal commensurates with the frequency of the vertical scanning frequency of the video signal outputted from the transmitter 2. The frequency of the external synchronizing signal may be either of a frame scanning frequency or a field scanning frequency, for example, in case of NTSC system the vertical synchronizing signal frequency is 60 Hz, therefore, the field frequency is 60 Hz and the frame frequency is 30 Hz.

Figure 8A:
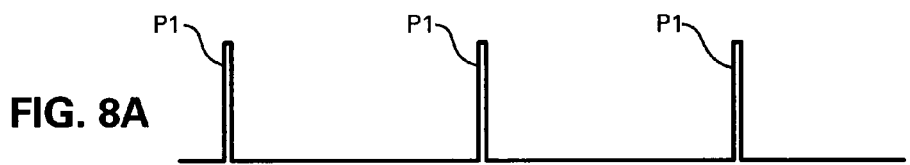
FIGS. 8A to 8D show electric signal waveforms of the external synchronizing signals.

As shown in FIG. 8A, the time of the external synchronizing signal P1 is generated jointly with the vertical synchronizing pulse, occurring during the vertical blanking period of the video signal transmitted from the television camera 2A shown in FIG. 5. Thereby, the external synchronizing signal P1 can be fed to the television camera 2A and through the camera transmission line 5 that propagates the video signal without affecting the video signal. The voltage level of the external synchronizing signal P1 is preferably made higher than the video signal. However, the voltage level of the external synchronizing signal P1 may be lower than the video signal or have a reversed polarity.

In the following description, a frame external synchronizing pulse having a voltage level higher than the white level of the video signal, in particular, a frame external synchronizing pulse corresponding to the phase of a second field is used as the external synchronizing signal P1.

Accordingly, the television camera 2A as shown in FIG. 5 comprises a comparison circuit 70 for comparing the voltage level of the vertical frame or field synchronizing pulse, fed from the external synchronizing signal generator 6 through the video transmission line 5 to a reference voltage source 71, and generating a pulse signal when a frame or a field synchronizing pulse is equal to or higher than the reference voltage, an internal synchronizing signal generator 72 for receiving the pulse signal outputted from the comparison circuit 70 and generating an internal synchronizing signal synchronized with the received pulse signal, and a video signal generating circuit 74 for generating a video signal.

One terminal of the comparison circuit 70 is connected to the video transmission line 5, and the other terminal of the comparison circuit 70is connected to the reference voltage source 71. The reference voltage of the reference voltage source 71 has a level higher than the white level of the video signal, preferably a level approximately equal to the synchronizing pulse level.

The internal synchronizing signal generator 72 generates horizontal and vertical synchronizing signals synchronously with the pulse signal outputted from the comparison circuit 70, synchronizing the video signal outputted from the video signal generating circuit 74 through the terminal 76 to the video transmission line 5.

Figure 6:
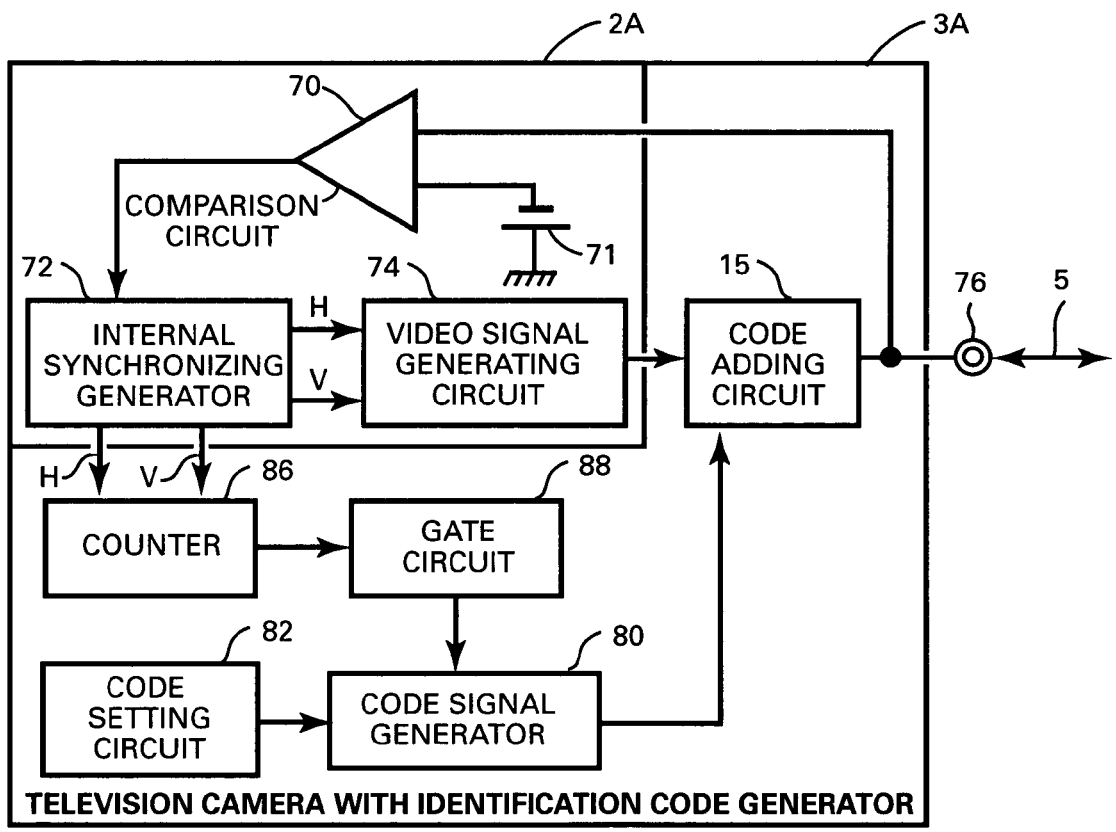
FIG. 6 is a block diagram showing an electric circuit of a television camera with an identification code generator of a preferred embodiment of the present invention.

When the identification code generators 3A are placed inside the transmitter 2 as shown in FIG. 1, the terminal of the comparison circuit 70 shown in FIG. 6 is connected directly to the video transmission line 5, through terminal 76.

The synchronizing generator 6 connected to the input circuit 11B shown in FIG. 3 injects the frame or field external synchronization pulses into the video transmission lines 5 connecting the identification code generator 14 and the code adding circuit 15; however, it can be injected into the video output terminal 18, and as will be explained, regardless of the locations of where the identification code signals are injected into the video transmission lines, it is possible to inject the external synchronizing pulses anywhere along the video transmission lines.

Figure 7:
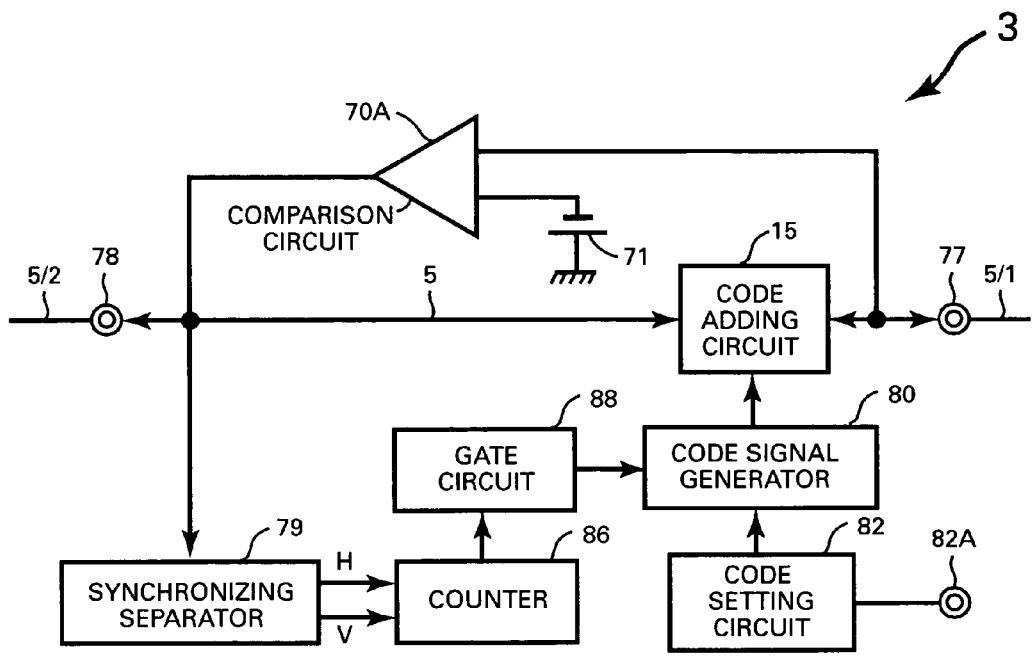
FIG. 7 is a block diagram showing another embodiment of the identification code generator circuit of the present invention.

When the identification code generators 3 of FIG. 7 are disposed along the video transmission line 5, and the external synchronizing pulses are fed to the transmission line 5/1, a comparison circuit 70A shown in FIG. 7 is placed across the identification code generator 3 for transferring the external synchronization pulses from the terminal 77 of the code generator 3, connected to the transmission line 5/1 side, to the terminal 78 connected to the television camera 2A via transmission line 5/2.

One input terminal of the comparison circuit 70A is used for comparing the voltage level of the field or frame synchronizing pulse received from the external synchronizing signal generator 6 through the video transmission line 5/1 and through terminal 77 to a reference voltage 71, and regenerating a pulse signal when the synchronizing pulse is equal or higher than the reference voltage. The other input terminal of the comparison circuit 70A is connected to the reference voltage source 71, having a voltage level higher than the white level of the composite video signal, preferably a level approximately equal to the synchronizing pulse level.

The output terminal of the comparison circuit 70A is connected to video transmission line 5/2 through terminal 78 for outputting the regenerated pulse, thereby, the comparison circuit 70A is effectively a by-pass or transfer circuit for transferring the field or frame synchronizing pulse across the identification code generator 3 to the transmitter 2, enabling to dispose the identification code generator anywhere along the video transmission line 5.

Since the internal synchronization generator 72 is synchronized with the injected external frame of field synchronizing pulse, the synchronizing pulse presence on the video transmission line 5 is within the period corresponding to the vertical blanking interval of the video signal. In this step, the external frame or field synchronizing pulse is transmitted by the use of the transmission line for the video signal without affecting the video signal transmitted from the television camera.

However, to avoid an input signal level error it is preferable to remove signal levels that are larger than the white level of the video composite signal from the video signal reaching the output terminal 18 of the input circuit 11 of the digital recorder 30.

Figure 8B:
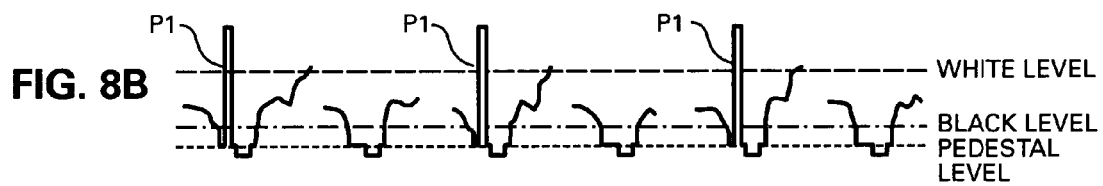
Figure 8C:

The external synchronizing generator 6 shown in FIG. 2 generates and feeds two pulse signals P1 and P2, corresponding to a predetermined rate, width and level, as shown in FIGS. 8A and 8C.

The phase of the pulse signals P1 and P2 corresponds to the vertical blanking interval of the video signal, as shown in FIG. 8B, and at the same time the pulse signals P1 and P2 are shown having a frame rate, i.e., generated every second vertical field synchronizing signals. Further, the frame synchronizing pulse signal P1 has a level higher that the white level of the video signal, as shown in FIG. 8B and as the pulse P1 is injected into the video transmission line 5, the video signals fed to the input 11 results in a signal shown in FIG. 8B, showing that the pulse signal P1 is injected within the period corresponding to the vertical blanking interval.

Figure 8D:
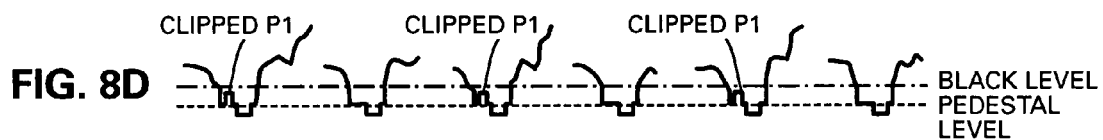

The other input of the synchronizing pulse clipping circuit 19 is fed with pulse P2 shown in FIG. 8C for clipping the signal corresponding to the pulse signal P1 within the video signal fed to the output terminal 18 of the input circuit 11, to below or about the black level of the video signal as shown in FIG. 8D. Therefore, the pulse P1 is removed from the video signal fed to the digital recorder 30 through the synchronizing pulse clipping circuit 19, and will not influence the input circuit of the digital recorder 30.

The external synchronizing pulse clipping circuit 19 shown in FIG. 2 is provided for clipping the synchronizing pulse P1 from a signal fed from the video transmission line 5 through the output 18 by using the timing signal P2 to clip the pulse P1 and output a video signal containing no synchronizing pulse P1. Since the duration of P2 covers the period of the external synchronizing pulse P1 the external synchronizing signal P1 will be removed by the clipping circuit 19 from the video signal fed to the input circuit 11. Though the pulse P2 shown in FIG. 8B is a positive pulse any other pulse size and polarity that is timed to coincide with pulse P1 of FIG. 8A can be used to activate a clipping circuit 19 shown in FIG. 2.

Accordingly, even though the external synchronizing signal P1 is present in the video signal fed from the television camera 2A through the transmission line 5 it is removed by the clipping circuit 19, therefore the external synchronizing signal P1 injected into the information transmission line 5 will synchronize the television camera 2A and will not cause any receiving error at the input circuit 11.

Instead of injecting the synchronizing pulse into the transmission lines the frame synchronizing pulse signal P1 may be outputted directly to the comparison circuit 70 of the television camera 2A.

In case the television camera 2A is not provided with the comparison circuit 70, the pulse signal P1 or P2 may by outputted to the internal synchronizing generator 72 of the television camera 2A. In the latter case, the synchronizing pulse injection and the synchronizing pulse clipping circuit 19 are not needed.

In case the television camera 2A is synchronized by the known horizontal and vertical synchronizing signal, or by a composite synchronizing signal known as GENELOCK, or the horizontal and vertical drive signals, or the vertical drive signal, a generation circuit for the horizontal and vertical synchronizing signals, or composite synchronizing signal, or the horizontal and vertical drive signals or the vertical drive signal may be disposed, instead of the synchronizing pulse generator 6. In this case, the synchronizing pulse injection and the synchronizing pulse clipping circuit 19 are not needed.

Moreover, according to the present invention, it is possible to connect non externally synchronized camera 2B for processing, digital recording and retrieving signal, by using for example, a well known time base corrector 7 that may include frame or field memory circuit disposed at the input circuit 11D shown in FIG. 4, whereby, the time base corrector and/or the frame or field memory circuit will store at least one vertical scanning period of the video signals generated by transmitter 4B and retrieve the stored video signals for outputting the signals in concert with the synchronizing signal generated by the synchronizing generator 6B. The time base corrector 7 will regenerate the fields or frames of the video signals fed by the transmitter 4B, synchronously on the basis of the external sync signals and repeatedly with every sequencing cycle, and feed the synchronously regenerated video signals to the digital recorder 30.

It should be noted that the parts of the television camera and the synchronizing signal generator and/or the time base corrector which are known have not been described in detail herein because they are disclosed in the above referenced patents.

As shown in FIG. 6 the identification code generator 3A incorporates a counter 86 for counting the number of the horizontal scanning lines. The adder input of counter 86 receives the horizontal synchronizing signal, generated by the internal synchronizing signal generator 72, and the clear or reset input of the counter 86 receives the vertical synchronizing signal, thereby, the counter 86 counts the number of the horizontal scanning lines every field or frame of the vertical scanning period of the television camera 2A or 2B. The output of counter 86 is fed to the gate circuit 88.

The identification code generator 3 shown in FIG. 7 incorporates a synchronizing separator 79 for separating the internal synchronizing signal generated by the television camera 2A or 2B and transmitted through the video transmission line 5, for outputting the horizontal synchronizing pulses and the vertical synchronizing pulses to the counter 86. Therefore, the identification code generator 3, shown in FIG. 7 can be placed along the video transmission line, remotely from the television camera 2A. If a non-external synchronized camera 2B is used than the comparator circuit 70 and the reference 71 shown in FIGS. 5 and 6 are not needed and are not used.

The gate circuit 88 outputs a gate signal to the code signal generator 80 only when the count number in the counter 86 remains at a predetermined value, for a duration of at least one horizontal scanning line period. It is preferable that the predetermined value of the counter number is within the vertical blanking period, for example, in the NTSC system the first 21 horizontal scanning lines are within the vertical blanking period, therefore, it is preferable that the gate signal, generated by the gate circuit 88 is outputted for any predetermined number of horizontal scanning lines, within, for example, the 9th to the 20th horizontal scanning lines of one vertical scanning period.

The code signal generator 80 is connected to a code setting circuit 82 for setting the camera identification code, therefore, the code generator 80 outputs a code signal corresponding to the identification code, set in the code setting circuit 82, to a code adding circuit 15 when the gate signal is received and for the duration of the gate signal.

The identification code set in the code setting circuit 82 is an individually allotted code to each of the transmitters 2, to identify the video signal generated by the corresponding transmitter 2. Identification code such as numbers, "1", "2", "3" . . . "n", can be used as camera identification code, respectively.

An apparatus for generating code signals and a circuit for injecting code signals into the video signal is disclosed in U.S. Pat. No. 4,943,864, the entire content of which is incorporated herein by reference, therefore, the information signals received by the digital recorder 30 incorporate an identification code.

Figure 11A:
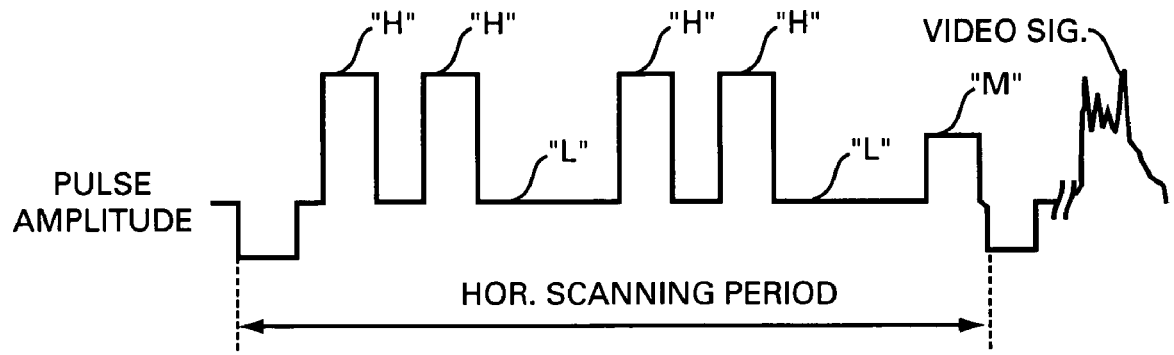
FIGS. 11A-11C are waveforms of an electric identification code signal.
Figure 11B:
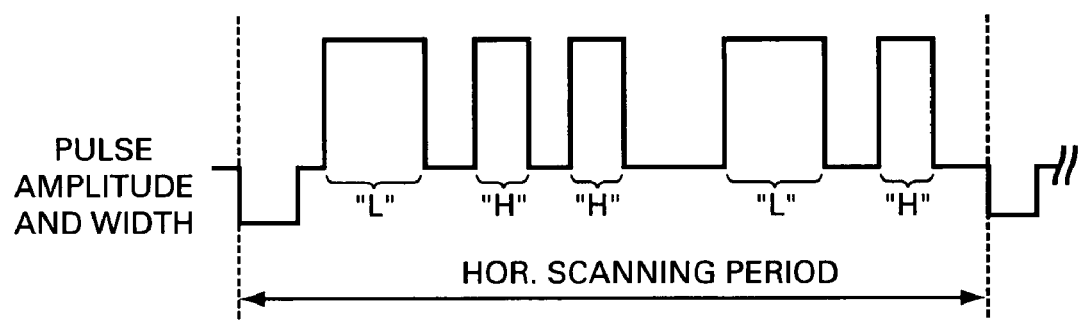

The code signal is a binary code or a bar code signal having two or more levels, composed of a high level or white, which is the maximum level of the picture signal in the video signals, a low level or black, which is lowest level of the picture signal, and a median level or gray, which is the mid level of the picture signal in the video signal, generated by the television cameras 2A or 2B as shown in FIG. 11A; the identification code may be a combination of pulse signal levels and varying pulse widths as shown in FIG. 11B.

Figure 11C:
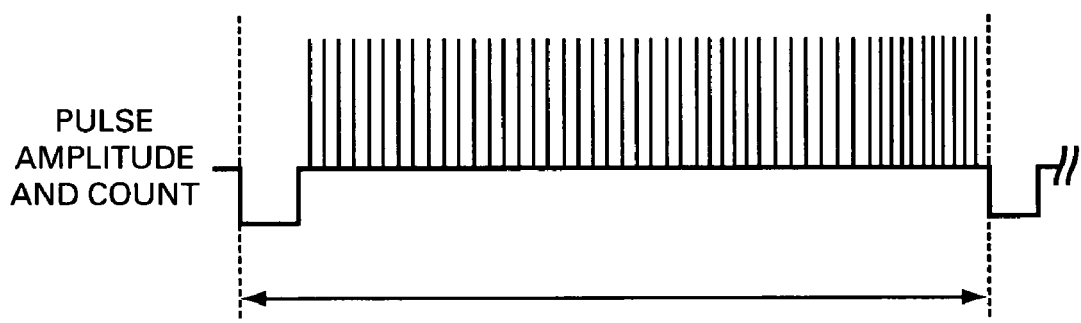

Alternatively, the code signal may be either a sine-wave signal or a pulse signal having a frequency corresponding to the identification code, and the sine-wave or the pulse signal is generated during one or more horizontal scanning period as shown in FIG. 11C, preferably, during the vertical blanking period.

The code adding circuit 84 superposes the code signal fed from the code signal generator 80, into the video signal fed from the corresponding television camera 2A or 2B, and then outputs a signal composed of the code signal superposed in the video signal, to the video transmission line 5, through the terminal 76, to be connected to the input 31 of the digital recorder 30.

For identifying the identification code the CPU 40 comprises a code extractor circuit 100 shown in FIG. 9. The code extractor circuit receives the video signal through terminal 101 and feeds the received signal to a synchronizing separator 102 and to a gate circuit 106. The synchronizing separator feeds the horizontal and vertical sync to a sync counter 104 that counts the horizontal lines to a predetermined value or values in the same way counter 86 of FIG. 7 counts the horizontal lines and feeds gate-on signal to the gate circuit 106 during the predetermined counted horizontal line or lines for switching on the gate circuit 106 to pass the video signal to a level sensor 108. The level sensor 108 thereby is fed with the video signal portion that contains the coded identification for detecting its envelope or shape and outputting the extracted code through the output terminal 109 to be processed by the CPU 40.

It become obvious that any of the input circuits 11, 11B and 11D will output synchronous video signal incorporating an allotted identification code for recording, storing and retrieving the signals on the basis of the identification code.

Figure 12:
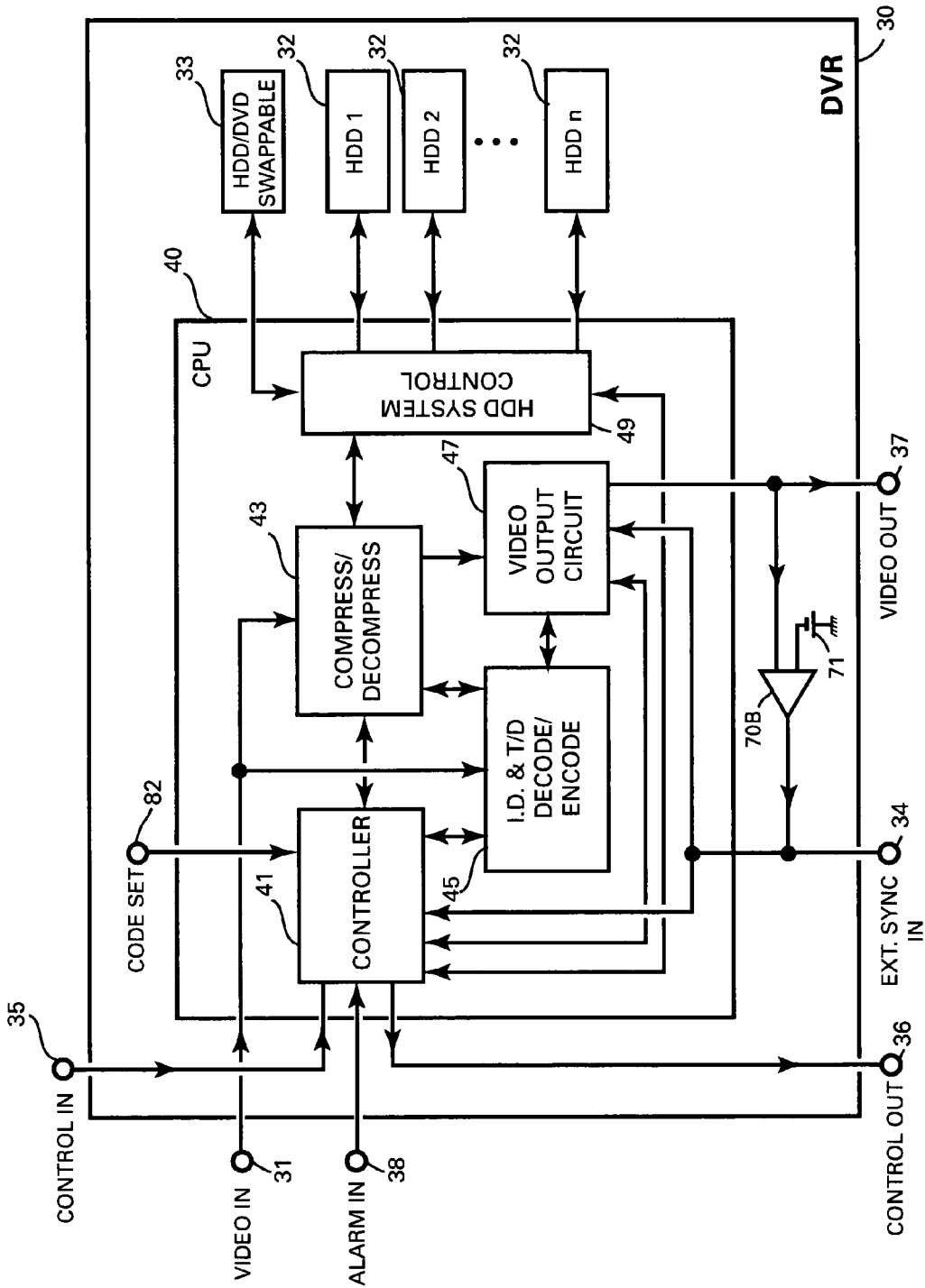
FIG. 12 is a block diagram of an electric circuit of the digital recorder of the preferred embodiment of the invention.

The digital video recorder 30 shown in FIG. 12 comprises a CPU (Central Processing unit) 40 comprising a well known microprocessor circuits or a personal computer (PC), one or more memory storage devices, such as the well known HDD (Hard Disk drive) 32 and at least one removable or swappable memory storage device 33, such as HDD or the well known DVD disk or CD disk drive.

The CPU 40 comprises a well known compress/decompress circuit or software package 43 for compressing the video signal fed to digital recorder through its video input terminal 31 employing any one of the well known compression formats such as JPEG, MJPEG, WAVELET, MPEG, MPEG1, MPEG2, MPEG4 or similar format and for feeding the compressed signals along with the time and date and the identification code of the processed signal to the HDD 32 memory storage devices through the HDD system control 49.

The well known compress/decompress circuit 43 may comprise a memory buffer for providing timing adjustments between the compress and the decompress cycles of the circuits and as will be explained later, this memory buffer enables to externally synchronize the clock and/or the sync of the decompress circuits output signal independently from the compress circuits input signal sync. Alternatively, the output circuit 47 may comprise such a memory buffer for externally synchronizing the output signal independently from the sync of the signal fed from the decompress circuit.

The well known HDD system control, using hard disk management software, such as used with personal computer (PC), manages the HDD 32 drives, so as to feed the HDD 32 to its maximum capacity and when more than one HDD 32 are employed, to feed all the HDD 32 drives one after another, each to its maximum capacity. When the last HDD 32n is full with no capacity left to continue the recording, the HDD system control 49 will feed the freshly compressed signal into the first HDD 32 device for storing the freshly compressed signals by removing the oldest stored compressed signals, in a rotation known as FIFO (First In First Out).

Whenever an alarm signal is fed through the alarm-in terminal 38 to the controller 41 of the CPU 40 the controller feeds an alarm state command to the HDD system control so as to continue recording and storing the compressed video signals, in a routine FIFO storing manner, and when the alarm is cleared transfer the compressed video signals recorded during the alarm state, plus n time duration of pre alarm and/or post alarm stored signals to the removable/swappable memory storage device 33. It is preferable that the transfer of the recorded compressed video signals to the removable/swappable memory storage device is actually a reproduction or duplication of the stored compressed signals, leaving the routinely recorded and stored signals in its original form, in order not to disrupt the FIFO recording integrity, so as to maintain an undisturbed recording in simple FIFO rotation throughout the time, yet to provide a separate long term or permanent storage means for the recordings, recorded during an alarm, or as selected by the user, the recording of a recorded alarm plus an n time of pre alarm and/or post alarm recording.

Similarly to the alarm recording process it is possible to transfer in the same manner any particular recorded event by a manual command through a selector keyboard 39 shown in FIG. 1, or by setting a program for an automatic, timer control command program for transferring particular recording through a user selectable time and date and for a user selectable n time duration.

The CPU 40 further comprises a video output circuit 47 for processing a decompressed video signal for superposing time and date, and/or identification code number and/or, name or text and a circuit 45 which includes time and date generator and an alarm code generator for decoding/encoding the identification code and/or the time and date and/or the alarm particulars.

The decoding portion of the I.D and time/date decoder/encoder circuit 45 can be a circuit such as the circuit 100 of FIG. 9, wherein the video signals are fed through the input terminal 101 and the extracted code outputted from the output terminal 109 is fed to the controller 41, and to the HDD system control 49 and to the compress/decompress circuit 43 for further processing and feeding the decoded identification code along with the compressed signal for storage into the HDD memory devices 32.

The encoding circuit portion 90 of the ID and time/date encode/decode circuit 45 (FIG. 12) shown in FIG. 10 comprises a Horizontal sync counter 94 for counting the horizontal lines of the decompressed video signal on the basis of the Horizontal and Vertical sync pulses fed from the decompress circuit 43 for counting the horizontal line or lines and feeding gate-on signal during a predetermined count of horizontal line or lines. In the following description, the identification code is injected into single horizontal line 11 or into dual horizontal lines 11 and 12, the time and date are injected into three horizontal lines 14 to 16, and the alarm particulars are injected into single horizontal line 18 or dual horizontal lines 18 and 19. Accordingly, the horizontal sync counter 94 counts line 11 or lines 11 and 12 and feeds gate-on signal to the gate 96 for the period of line 11 or lines 11 and 12. The gate circuit 96 transfers during line 11 or lines 11 and 12 the identification code from the code generator 92 to the code adding circuit 98 of the video output circuit 47, and the code adding circuit 98 injects the identification code into the video signal. When the horizontal sync counter 94 count lines 14 to 16 it generates a gate on command to the gate 96 for transferring a time and date code which can, for example, be a binary number comprising the accumulative number of seconds, with the Jan. 1, 2000 is zero and increasing incrementally with each passing second by one, thereby the seconds count, for example, for Jan. 10, 2001 at 24.00 hr. will be 375 days×24 hours×60 minutes×60 seconds=32,400,000 seconds, accordingly, the control unit will feed to the code generator the accumulative number of seconds, of the actual time and date of the recording of the signal and the code generator 92 will convert the number into a binary code, or a bar code, the same way the identification code is generated and will feed the code to the code adding circuit 98 for injecting the time and date code into the video signal, during horizontal lines 14, 15 and 16. When the horizontal sync counter 94 counts the horizontal line 18 or lines 18 and 19 and if the recalled signal was recorded during an alarm state, the controller will feed a preprogrammed data such as the alarm location, its number and other particulars to the code generator which converts the data into binary code, or bar code and feeds the code to the code adding circuit 98 for injecting the alarm particulars during the horizontal line 18 or lines 18 and 19. By such arrangement the output video signal fed from the digital recorder can be propagated freely to a playback receiving stations for displaying a clean pictures, unobstructed by a superimposed text and/or time-date and/or other displays that commonly cover important portions of the displayed picture.

In the preferred embodiment of the present invention, the adding circuits 15 or 98 may include a mixer circuit wherein the code signals are mixed and injected into the video signal. Such mixer circuit is disclosed in U.S. Pat. No. 4,989,085, the contents of which are incorporated herein by reference, or it can be an injection circuit disclosed in U.S. Pat. No. 5,335,014, the entire content of which is incorporated herein reference.

As shown in FIG. 10 the code is also fed through the gate 96 to a memory circuit 97 and to an OSD (On Screen Display) circuit 99 of the video output circuit 47. The memory circuit 97 contains the name, text and alarm particulars related to the allotted identification code and to each alarm signal and/or other particulars of the alarm locations etc, for feeding the data to the OSD circuit 99 and upon command received from the controller 41 the OSD circuit 99 switches off or on for superimposing onto the picture a display of the time/date of the recording, and/or identification number and/or name and/or text and/or alarm details. The control circuit 41 command can be automatically activated during programmed events or during alarms, or can be manually activated through the selector keyboard 39 shown in FIG. 1. Further the memory circuit 97 can be used to store graphics pertaining, such as a location of a camera or of an alarm sensor and feed such graphic data to the OSD circuit 99 for superimposing onto the picture on screen graphic displays.

Figure 13:
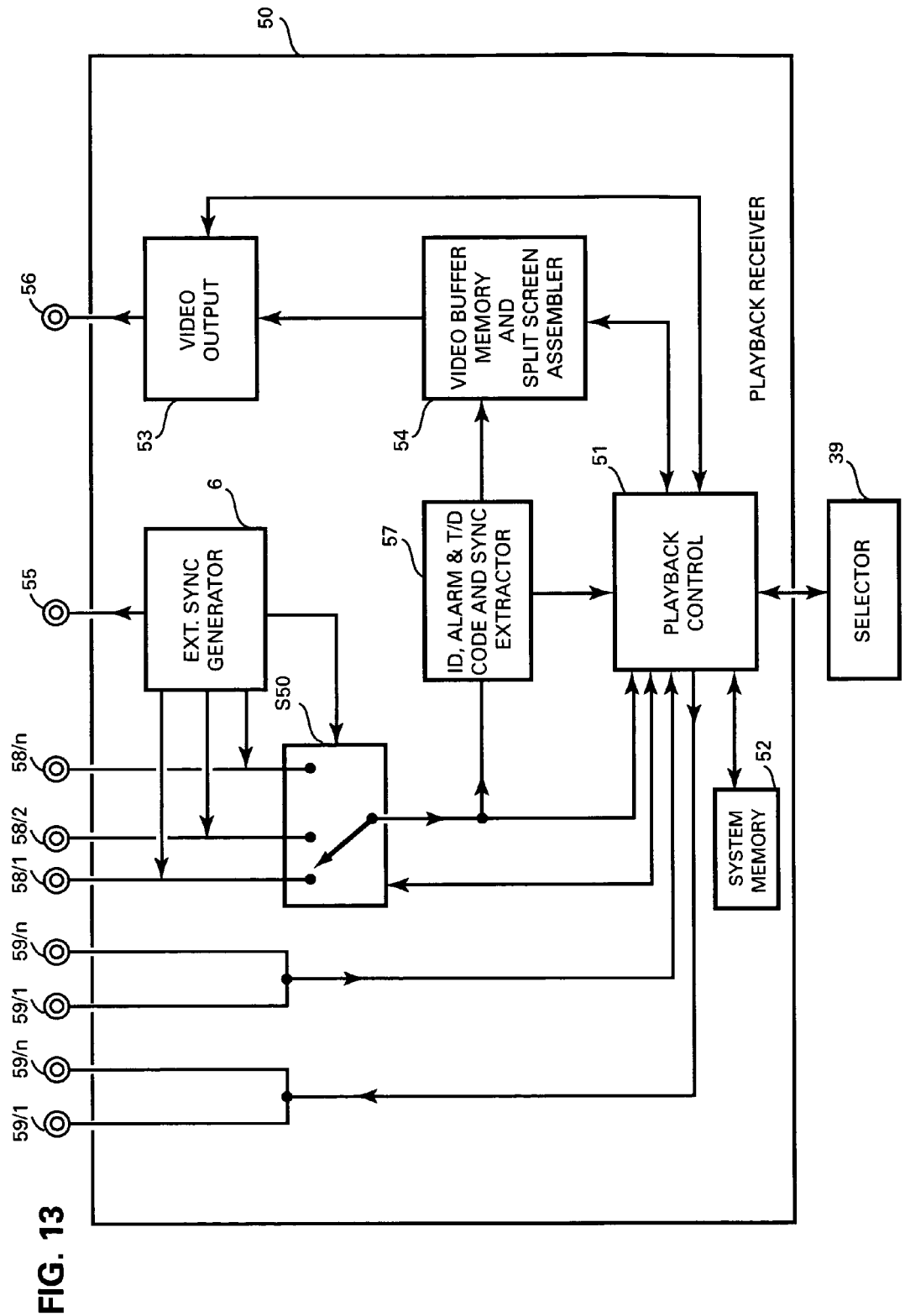
FIG. 13 is a block diagram of an electric circuit showing a playback receiver of the preferred embodiment of the present invention.
Figure 14:
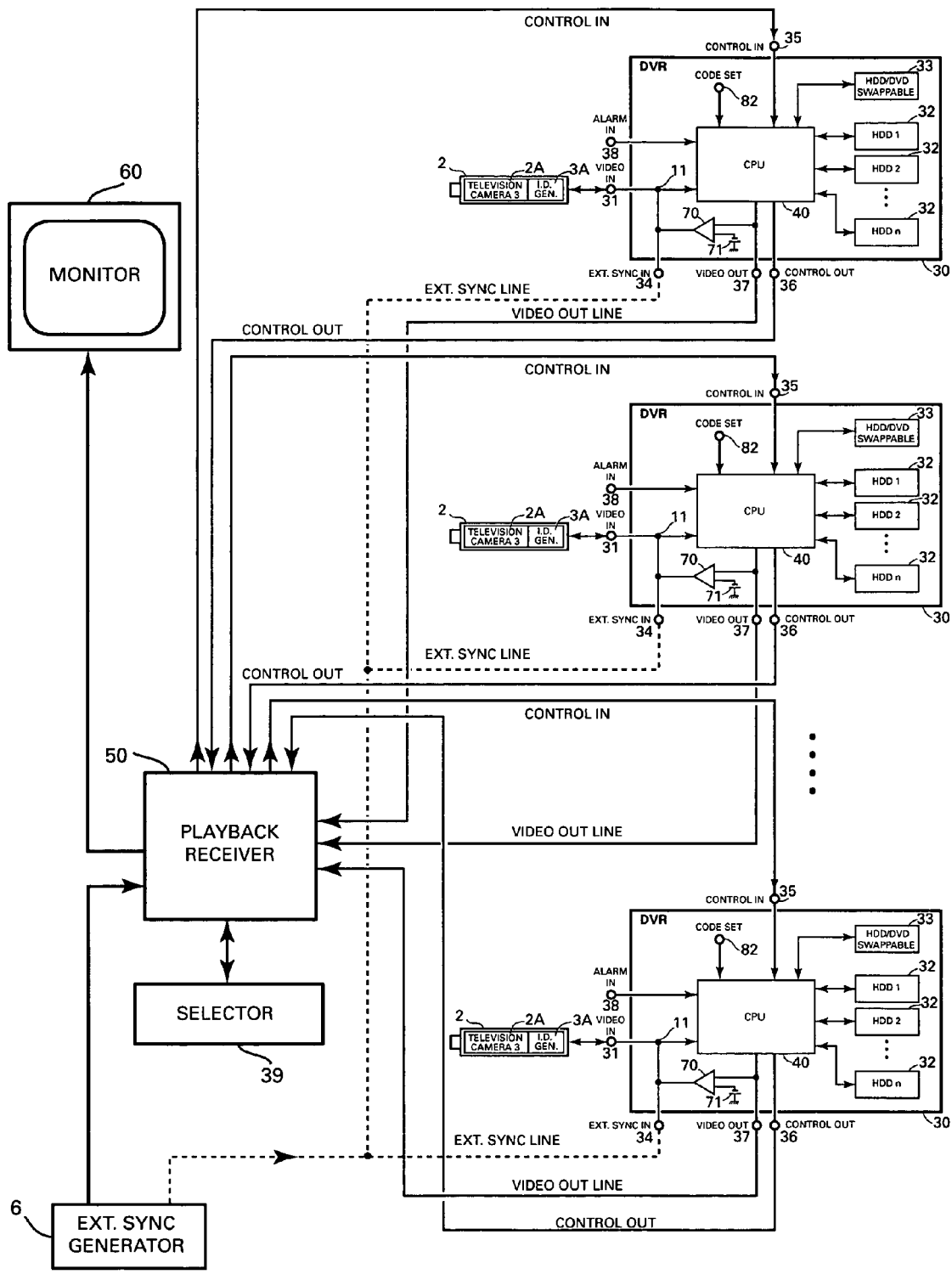
FIG. 14 is a block diagram of an electric circuit showing a multi digital recorder setup of the preferred embodiment of the present invention.

As shown in FIG. 1 the external sync signal can be fed through the ext. synch in terminal 34 or through the video out terminal 37 connecting the video out to an input 58 of playback receiver 50 of FIG. 13. The video out line is also connected to an input of a comparator circuit 70B which is similar to the comparator circuits 70 of FIG. 5 and 70A of FIG. 7. The other input of the comparator is connected to a reference signal 71, thereby, the comparator circuit 70B acts as a separator for separating an external sync signal fed through the video out line the same way the comparators 70 of FIG. 5 and 70A of FIG. 7 are separating the external sync signal from the video signal. Accordingly the separated external sync signal is connected and applied to the CPU 40 and to the camera 2A via the switch S37 and the input terminal 31.

Shown in FIG. 13 is a playback receiver 50, having n number of inputs 58/1, 58/2 and 58/n connected to a selector switch S50 and each of the input is also connected to an external sync generator 6 for feeding external sync pulses to a plurality of digital recorders 30 through the video out line in reverse direction to the video signal propagation, therefore when multiple video digital recorders 30 are connected via transmission lines to a playback receiver 50 through the video out 37, the external sync signal present on the video out line is separated by the comparator circuit 70B and is fed to each of the CPU 40 and to the cameras 2A through the video in terminals 31.

Furthermore, according to the present invention, it is possible to synchronously monitor and playback the stored signals of camera 2B shown in FIG. 4 without the use of the time base corrector 7 and without injecting the identification code via the code adding circuit 15.

Since the digital video recorder 30 is recording and playing back single channel, the CPU can be programmed to inject an I.D number into the playback or monitored video signal by a command through the code set 82 of FIG. 12 or through the selector 39 of FIG. 1 via control in line 35.

Similarly as the timing of the decompressing of signals and the timing of the retrieving signals for playback is processed separately from the timing of the recording and the camera sync, it is possible to lock the sync time of the monitored and the playback signal to the external sync signal regardless of the synchronizing of camera 2A or 2B. Accordingly it is possible to switch off the external synch switch S37 and apply the external sync signal fed to the digital video recorder 30, via the output terminal 37 or via the ext. sync in terminal 34 to the CPU 40 only and not to the camera 2B. By this the camera 2B of FIG. 4 can be connected to the input terminal 31 instead of the camera 2A shown in FIG. 1, yet multiple digital video recorders 30 each connected to camera 2B can be all externally synchronized for feeding multiple synchronous output signals to the receiver 50.

The controller 41 of the CPU feeds to the decompress circuit 43 and to the identification code and time and date encode circuit a control signals timed with the external sync signal for feeding an externally synchronized and locked video signal injected with identification code signal via the video output circuit 47 to the video out terminal 37.

The code set 82 provides for setting an identification code to the controller 41. The code can be set by a binary DIP switch or by a flash memory recorded with a specific identification code, or any other memory device or well known binary ICs programmed or set to an identification number.

By this arrangement, as stated, the present invention provides for non coded and non externally synchronized camera signal to be connected to the digital video recorder 30 for recording and for retrieving the decompressed and the recorded signals for monitoring and for playback that is externally synchronized and coded with identification code signal.

The selector 39 shown in FIG. 1 can be a keyboard with indicators or with a display such as LCD for generating select command through the control-in terminal 35 and for receiving data pertaining the time and date of the recording, and/or the alarm details and/or the identification number or numbers of the stored and/or the played back signals, etc through the control-out terminal 36.

The controller 41 (shown in FIG. 12) of the CPU 40 using a well known microprocessor circuit updates throughout the time its data, pertaining the time and date of the routine and the alarm recordings and thereby can provide through the control-out terminal 36 detailed data of the location of the recorded files within the HDD drivers 32 as well as access instantly the recorded files for retrieving the selected signals upon command for playback.

The playback receiver 50 shown in FIG. 13 consist of a code extracting circuit 57 shown in FIG. 13 for extracting the identification code from the received video signal through the selector 50 for feeding the extracted identification to a playback control circuit 51. The code and sync extracting circuit 57 further outputs the sync separated by the sync separator 102 of FIG. 9 to the video buffer memory and split screen assembler circuit 54. The video buffer memory circuit 54 is fed with a selective playback or monitored video signals through the output terminal of the playback control circuit 51, which is fed with played back or monitored signals through the selector switch S50. The playback control will process the selective video signal and feed it to the video buffer memory 54 only when the extracted code, extracted by the code extraction circuit 57 fed to it and the select code fed by the selector 39 are a match code. A match code signal is also fed to the video buffer memory 54 from the playback control for opening the memory input, for freshly renewing the stored buffered video signal of at least one vertical scanning period of the video signal.

Therefore, the match signal generated by the playback control 51 will initiate the refreshing cycle of the memory circuit 54 of at least one field or frame of the video signal only when the signal is superposed with an identification code that corresponds to the selected code, set by the selector 39.

It is also possible to feed the video buffered memory and split screen assembler 54 with multiple camera signals by sequentially selecting multiple identification codes through the selector 50 and upon command by the selector through the playback control 51 to combine several camera signals into one display such as the well known quad, 9 split or 16 split displays, or the well known picture in picture displays, etc. Further, as the multiple selected playback signals are all synchronously locked to each other it is possible to recall synchronous split screen displays efficiently.

The video output circuit 53 is similar to the video output circuit 47 of the digital recorder 30 of FIG. 16, comprising of an OSD (on screen display) for displaying upon command onto the picture displayed on the monitor 60 the time and date of the recording and/or the identification code and/or name and/or text and/or the alarm particulars, all fed from the playback control 51 on the basis of data stored in a system memory 52.

The system memory 52 can also be fed manually or automatically via the playback control with data pertaining the transmitters 2, 4 or 4B and/or the data pertaining the alarm sensing particulars of each individual digital recorder means 30. By such memorized data the playback control is able to instantly address the selector S50 to select the correct input line 58/1~58/n pertaining a selected identification code or of a given transmitting means 2, 4 or 8.

The playback control 51 is further provided with data in-out terminal or terminals 59/1~59/n for transmitting record or playback select commands to the digital recorders 30 and for receiving data pertaining the recording and/or playback and/or alarms particulars.

By the use of the playback receiver it becomes clear that with a simple connections of a plurality of externally synchronized digital video recorders 30 it is possible, according to my invention, to monitor or playback the any of recorded signals of large number of cameras individually or plurality of such playback signals synchronously into a split screen display, transforming multiple set up of cameras each connected to a single input digital recorders into a multiple time capture and playback device by a simple select command of a time and date, camera identification and/or alarm particulars. It is further obvious that by providing the data pertaining the camera identification, the time and date of the recording and the alarm particulars inside the vertical blanking portion of the video signals it is possible to propagate a clean unobstructed playback signals and superimpose the data onto the picture by an operator command only when it is needed.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for outputting a plurality of synchronous video signals from a plurality of digital recorders to a receiver, said synchronous video signals selected from a group comprising a playback of recorded signals, relayed signals and a combination thereof are originated and fed to said digital recorders via first transmission lines by a plurality of video transmitters;

each of said synchronous video signals contains a code signal corresponding to a code allotted to one of said transmitters and a synchronous time and date signal corresponding to one of the time and date of the recording of said recorded signal and the time and date of outputting said relayed signal;

said synchronous video signals are fed to said receiver via second transmission lines for outputting a display signal selected from a group comprising at least one individual video signal, sequencing individual video signals, at least one multi screen signal and sequencing multi screen signals;

said receiver includes an external synchronizing signal generator for synchronizing said plurality of digital recorders and a controller for generating a retrieval signal for retrieving said video signals on the basis of at least one said code and said time and date and for selecting said display signal;

each of said digital recorders include a synchronizing receiving and application circuit selected from a group comprising central synchronizing circuit for synchronizing a central processing unit included in each said digital recorders, playback lock circuit for synchronizing said playback of recorded signals, combined lock circuit for synchronizing said recording, said playback and a monitoring mode, time base correction circuit for synchronizing the timing of an internal synchronizing of a video signal originated by at least one of said transmitters, relay circuit for transferring said external synchronizing signal to at least one of said transmitters via said first transmission lines and combinations thereof, said method comprising the steps of:

a. generating and feeding said external synchronizing signal to synchronize said plurality of digital recorders via said second transmission lines;

b. generating and feeding said retrieval signal to said plurality of digital recorders via said second transmission line for selectively retrieving said synchronous video signals; and c. selecting said display signal.

2. The method as set forth in claim 1, wherein said digital recorders record said video signals by routinely processing said video signals and storing the processed video signals on the basis of said time and date into at least one memory storage device to its capacity, in endless rotation, wherein freshly stored signals replace the oldest stored signals.

3. The method as set forth in claim 2, wherein said memory storage device includes at least one exclusive memory portion for excluding a selected stored video signal from said endless rotation, comprising the further step of:

commanding a respective digital recorder to duplicate and re-store said selected video signal into said exclusive memory portion.

4. The method as set forth in claim 2, wherein said step of feeding said external synchronizing signal to said digital recorders, comprising the further steps of:

propagating a pulse signal having a voltage level higher than a maximum voltage level of said video signals or lower than a minimum voltage level of said video signals to a respective digital recorder over one of said second transmission lines, in opposite direction to the propagation of said video signal over the same transmission line, by using a blanking period of said video signal;

applying said pulse signal to said receiving and application circuit.

5. The method as set forth in claim 4, wherein said pulse signal is opposite in polarity to an internal synchronizing signal which is contained in said video signals.

6. The method as set forth in claim 2, wherein each digital recorder further includes an alarm input for triggering alarm recording and for generating an alarm code for each of the triggered alarms, comprising the further step of:

registering said stored signals processed during each triggered alarm on the basis of each said alarm code for playback retrieval and for introducing alarm code signal corresponding to said alarm code into said synchronous video signals along with said allotted code and said time and date.

7. The method as set forth in claim 6, wherein said memory storage device includes at least one exclusive portion for excluding signals stored during said alarms from said endless rotation, comprising the further step of:
programming said digital recorders to duplicate signals processed during alarm and re-store the duplicated alarm signals into said exclusive memory portion.

8. The method as set forth in claim 7, wherein said step of duplicating and re-storing said signals processed during alarms, comprising the further step of:
duplicating and re-storing signals processed prior to said triggering of said alarm and after said alarm has been cleared.

9. The method as set forth in claim 8, wherein said step of generating said retrieval signal is adapted for retrieving said alarms stored signals, comprising the further step of:
generating and feeding an adapted retrieval signal on the basis of at least one of said code signal, said time and date and said alarm code.

10. The method as set forth in claim 6, wherein said time and date and said alarm code signal are introduced into said synchronous video signals during a blanking period of said video signal.

11. The method as set forth in claim 6, wherein said receiver includes an on screen display circuit and select keys for superimposing upon command a selective alphanumerics onto a display of each said synchronous video signals, said superimposing selected from a group comprising an individual said allotted code for an individual display, multi said allotted codes for multi screen display, a single said time and date for an individual display, a single time and date for multi screen displaying identical time and date, multi said time and date for multi screen displaying varying said time and date, single said alarm code for a single alarm display, multi said alarm codes for multi screen displaying multi alarms and combinations thereof.

12. The method as set forth in claim 11, wherein said on screen display includes a memory for storing said allotted codes, alarm codes and related data selected from a group comprising names, text, alarm particulars, graphics, menus and combinations thereof for superimposing said data onto a display of said synchronous video signals upon command.

13. The method as set forth in claim 1, wherein said step of feeding said external synchronizing signal to said digital recorders, comprising the further steps of:
propagating a pulse signal having a voltage level higher than a maximum voltage level of said video signals or lower than a minimum voltage level of said video signals to a respective digital recorder over one of said second transmission lines, in opposite direction to the propagation of said video signal over the same transmission line, by using a blanking period of said video signal;
applying said pulse signal to said receiving and application circuit.

14. The method as set forth in claim 13 wherein said pulse signal is opposite in polarity to an internal synchronizing signal which is contained in said video signals.

15. The method as set forth in claim 1, wherein said step of feeding said retrieval signal via said second transmission lines is propagated in reverse direction to the propagation of said synchronous video signals fed to said receiver through same transmission line and is timed to coincide with a blanking period of said video signal.

16. The method as set forth in claim 1, wherein the introduction of said code signal into each said synchronous video signal is selected from a group comprising an introduction into said transmitters, an introduction into said first transmission lines, an introduction into said digital recorders and combinations thereof.

17. The method as set forth in claim 16, wherein said code signal is introduced into said video signal during a blanking period of said video signal.

18. The method as set forth in claim 1, wherein said receiver includes an on screen display circuit and select keys for superimposing upon command a selective alphanumerics onto a display of each said synchronous video signals, said superimposing selected from a group comprising an individual said allotted code for an individual display, multi said allotted codes for multi screen display, a single said time and date for an individual display, a single time and date for multi screen displaying identical time and date, multi said time and date for multi screen displaying varying said time and date and combinations thereof.

19. The method as set forth in claim 18, wherein said on screen display includes a memory for storing said allotted codes and related data selected from a group comprising names, text, graphics, menus and combinations thereof for superimposing said data onto a display of said synchronous video signals upon command.

20. An apparatus for outputting a plurality of synchronous video signals from a plurality of digital recorders to a receiver, said synchronous video signals selected from a group comprising a playback of recorded signals, relayed signals and a combination thereof are originated and fed to said digital recorders via first transmission lines by a plurality of video transmitters;
each of said digital recorders include a synchronizing receiving and application circuit selected from a group comprising central synchronizing circuit for synchronizing a central processing unit included in each said digital recorders, playback lock circuit for synchronizing said playback of recorded signals, combined lock circuit for synchronizing the recording, said playback and a monitoring mode, time base correction circuit for synchronizing the timing of an internal synchronizing of a video signal originated by at least one of said transmitters, relay circuit for transferring an external synchronizing signal to at least one of said transmitters via said first transmission lines and combinations thereof;
each of said synchronous video signals contains a code signal corresponding to a code allotted to one of said transmitters and a synchronous time and date signal corresponding to one of the time and date of the recording of said recorded signal and the time and date of outputting said relayed signal;
said synchronous video signals are fed to said receiver via second transmission lines for outputting a display signal selected from a group comprising at least one individual video signal, sequencing individual video signals, at least one multi screen signal and sequencing multi screen signals;
said receiver includes an external synchronizing signal generator feeding said synchronizing signal via one of said second transmission lines and dedicated lines to said receiving and application circuits for synchronizing each of said plurality of digital recorders and a controller for generating and feeding a retrieval signal via said second transmission lines to said digital recorders for retrieving said video signals on the basis of at least one said code and said time and date and for selecting said display signal.

21. The apparatus as set forth in claim 20, wherein said digital recorders record said video signals by routinely processing said video signals and storing the processed video signals on the basis of said time and date into at least one memory storage device to its capacity, in endless rotation, wherein freshly stored signals replace the oldest stored signals.

22. The apparatus as set forth in claim 21, wherein said memory storage device includes at least one exclusive memory portion for excluding a selected stored video signal from said endless rotation by commanding a respective digital recorder to duplicate and re-store said selected video signal into said exclusive memory portion.

23. The apparatus as set forth in claim 21, wherein said external synchronizing is a pulse signal having a voltage level higher than a maximum voltage level of said video signals or lower than a minimum voltage level of said video signals is fed to a respective digital recorder over one of said second transmission lines, in opposite direction to the propagation of said video signal over the same transmission line, during a blanking period of said video signal for feeding said pulse signal to said receiving and application circuit.

24. The apparatus as set forth in claim 23, wherein said pulse signal is opposite in polarity to an internal synchronizing signal which is contained in said video signals.

25. The apparatus as set forth in claim 21, wherein each digital recorder further includes an alarm input for triggering alarm recording and for generating an alarm code for each of the triggered alarms, and for registering said stored signals processed during each triggered alarm on the basis of each said alarm code for playback retrieval and for introducing alarm code signal corresponding to said alarm code into said synchronous video signals along with said allotted code and said time and date.

26. The apparatus as set forth in claim 25, wherein said memory storage device includes at least one exclusive portion for excluding signals stored during said alarms from said endless rotation by a program for duplicating the signals processed during alarm and for re-storing the duplicated alarm signals into said exclusive memory portion.

27. The apparatus as set forth in claim 26, wherein said duplicating and said re-storing are extended to include duplicating and re-storing signals processed prior to said triggering of said alarm and after said alarm has been cleared.

28. The apparatus as set forth in claim 27, wherein said generating of said retrieval signal is adapted for retrieving said alarms stored signals by generating and feeding an adapted retrieval signal on the basis of at least one of said code signal, said time and date and said alarm code.

29. The apparatus as set forth in claim 25, wherein said time and date and said alarm code signal are introduced into said synchronous video signals during a blanking period of said video signal.

30. The apparatus as set forth in claim 25, wherein said receiver includes an on screen display circuit and select keys for superimposing upon command a selective alphanumerics onto a display of each said synchronous video signals, said superimposing selected from a group comprising an individual said allotted code for an individual display, multi said allotted codes for multi screen display, a single said time and date for an individual display, a single time and date for multi screen displaying identical time and date, multi said time and date for multi screen displaying varying said time and date, single said alarm code for a single alarm display, multi said alarm codes for multi screen displaying multi alarms and combinations thereof.

31. The apparatus as set forth in claim 30, wherein said on screen display includes a memory for storing said allotted codes, alarm codes and related data selected from a group comprising names, text, alarm particulars, graphics, menus and combinations thereof for superimposing said data onto a display of said synchronous video signals upon command.

32. The apparatus as set forth in claim 20, wherein said external synchronizing signal is a pulse signal having a voltage level higher than a maximum voltage level of said video signals or lower than a minimum voltage level of said video signals fed to a respective digital recorder over one of said second transmission lines, in opposite direction to the propagation of said video signal over the same transmission line, during a blanking period of said video signal for feeding said pulse signal to said receiving and application circuit.

33. The apparatus as set forth in claim 32, wherein said pulse signal is opposite in polarity to an internal synchronizing signal which is contained in said video signals.

34. The apparatus as set forth in claim 20, wherein the feeding of said retrieval signal via said second transmission lines is propagated in reverse direction to the propagation of said synchronous video signals fed to said receiver through same transmission line and is timed to coincide with a blanking period of said video signal.

35. The apparatus as set forth in claim 20, wherein the introduction of said code signal into each said synchronous video signal is selected from a group comprising an introduction into said transmitters, an introduction into said first transmission lines, an introduction into said digital recorders and combinations thereof.

36. The apparatus as set forth in claim 35, wherein said code signal is introduced into said video signal during a blanking period of said video signal.

37. The apparatus as set forth in claim 20, wherein said receiver includes an on screen display circuit and select keys for superimposing upon command a selective alphanumerics onto a display of each said synchronous video signals, said superimposing selected from a group comprising an individual said allotted code for an individual display, multi said allotted codes for multi screen display, a single said time and date for an individual display, a single time and date for multi screen displaying identical time and date, multi said time and date for multi screen displaying varying said time and date and combinations thereof.

38. The apparatus as set forth in claim 37, wherein said on screen display includes a memory for storing said allotted codes and related data selected from a group comprising names, text, graphics, menus and combinations thereof for superimposing said data onto a display of said synchronous video signals upon command.

* * * * *